United States Patent
Zharkov et al.

(10) Patent No.: US 12,197,736 B2
(45) Date of Patent: Jan. 14, 2025

(54) MANAGING BOTH BASELINE AND BURST I/O REQUEST RATES

(71) Applicant: Dell Products L.P., Round Rock, TX (US)

(72) Inventors: Vitaly Zharkov, Modin (IL); Omer Dayan, Tirat Carmel (IL); Eldad Zinger, Raanana (IL)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/150,425

(22) Filed: Jan. 5, 2023

(65) Prior Publication Data

US 2024/0231630 A1    Jul. 11, 2024

(51) Int. Cl.
*G06F 3/06* (2006.01)

(52) U.S. Cl.
CPC .......... *G06F 3/0613* (2013.01); *G06F 3/0604* (2013.01); *G06F 3/0659* (2013.01); *G06F 3/067* (2013.01)

(58) Field of Classification Search
CPC .... G06F 3/0613; G06F 3/0604; G06F 3/0659; G06F 3/067
USPC ........................................................ 711/154
See application file for complete search history.

(56) References Cited

U.S. PATENT DOCUMENTS

| | | | |
|---|---|---|---|
| 9,537,777 B1 | 1/2017 | Tohmaz et al. | |
| 9,747,222 B1 | 8/2017 | Armangau et al. | |
| 10,552,322 B2 | 2/2020 | Hu et al. | |
| 11,163,449 B2 | 11/2021 | Faibish et al. | |
| 2017/0308406 A1* | 10/2017 | Kusters | G06F 3/061 |
| 2019/0129653 A1* | 5/2019 | Yang | G06F 3/0689 |
| 2022/0291866 A1 | 9/2022 | Shveidel et al. | |

OTHER PUBLICATIONS

Shveidel, Vladimir, et al.; "Maintaining Smooth Metadata Log Destaging and Burst Tolerance," U.S. Appl. No. 17/872,234, filed Jul. 25, 2022.

* cited by examiner

*Primary Examiner* — Hua J Song
(74) *Attorney, Agent, or Firm* — BainwoodHuang

(57) ABSTRACT

A technique of managing the rate of I/O (Input/Output) request processing includes a token-bucket arrangement having first, second, and third token buckets. The first token bucket is provided with sufficient tokens to accommodate an expected baseline level of I/O requests, whereas the second token bucket is provided with sufficient tokens to accommodate an expected excess level of I/O requests during bursts. The third token bucket is provided with tokens at predefined intervals and limits a total amount of bursting available during those intervals.

20 Claims, 4 Drawing Sheets

MANAGING BOTH BASELINE AND BURST I/O REQUEST RATES

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

It is often desirable for a storage system to control the speed of processing I/O (Input/Output) requests, such as reads and/or writes. For example, a storage system may impose a limit on the number or bandwidth of I/O requests that may be processed for a particular application, volume, or the like, over a particular time interval, so as to ensure a desired allocation of resources. Some implementations may use a token-bucket scheme for this purpose. For example, a bucket (i.e., a logical container) may be filled with tokens at a particular rate. To process an I/O request, one or more tokens is removed from the bucket to "pay for" processing the I/O request. If tokens in the bucket run out, further I/O requests may be queued or they may be failed, until enough tokens are replenished in the bucket to pay for the additional I/O requests. In this manner, the rate of processing I/O requests is limited based on the rate at which tokens are added to the bucket.

SUMMARY

Unfortunately, conventional token-bucket schemes involve deficiencies. For example, it is often desirable to allow applications to consume more than their baseline share of tokens to support "bursts," i.e., periods of elevated I/O request processing. A common example of a burst is when virtual machines are booted, resulting in a significant but temporary increase in the rate of I/O requests. With the prior scheme, a burst can drain a token bucket quickly, leaving fewer tokens available to maintain baseline levels of I/O request processing. This leads to a situation in which applications may have to "earn the burst," by depressing their baseline rates of I/O processing to save enough tokens to accommodate the burst. Although the rate of filling the token bucket can be increased, so that bursts can be accommodated without having to depress baseline processing, this approach also has deficiencies. For example, applications may raise their baseline rates of I/O processing in the absence of bursts, effectively consuming more than their fair share of resources. Also, applications may save up tokens and then burst at exceedingly high rates, effectively monopolizing processing resources and starving out other applications. What is needed is a way of managing both baseline I/O processing and bursts, which avoids the above deficiencies.

The above need is addressed at least in part by an improved technique that provides first, second, and third token buckets. The first token bucket is provided with sufficient tokens to accommodate an expected baseline level of I/O requests, whereas the second token bucket is provided with sufficient tokens to accommodate an expected excess level of I/O requests during bursts. The third token bucket is provided with tokens at predefined intervals and limits a total amount of bursting available during those intervals.

Advantageously, the first, second, and third token buckets provide more granular control than the prior scheme over baseline and bursting levels of I/O requests, while also limiting the amount of bursting that may be performed during the predefined intervals. The improved technique thus avoids the need to earn the burst while also limiting the amount of bursting that may be performed overall.

Certain embodiments are directed to a method of managing I/O request processing rate. The method includes receiving a plurality of I/O requests, the I/O requests including read requests and/or write requests, and processing the plurality of I/O requests in exchange for tokens, such that each I/O request is processed only if sufficient tokens are available to process the I/O request. The method further includes managing the tokens using first, second, and third token buckets, the first token bucket provided with sufficient tokens to accommodate an expected baseline level of I/O requests, the second token bucket provided with sufficient tokens to accommodate an expected excess level of I/O requests during bursts, and the third token bucket provided with tokens at predefined intervals and limiting an overall amount of bursting available during the predefined intervals.

Other embodiments are directed to a computerized apparatus constructed and arranged to perform a method of managing I/O request processing rate, such as the method described above. Still other embodiments are directed to a computer program product. The computer program product stores instructions which, when executed on control circuitry of a computerized apparatus, cause the computerized apparatus to perform a method of managing I/O request processing rate, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of managing the rate of I/O (Input/Output) request processing includes a token-bucket arrangement having first, second, and third token buckets. The first token bucket is provided with sufficient tokens to accommodate an expected baseline level of I/O requests, whereas the second token bucket is provided with sufficient tokens to accommodate an expected excess level of I/O requests during bursts. The third token bucket is provided with tokens at predefined intervals and limits a total amount of bursting available during those intervals.

Figure 1:
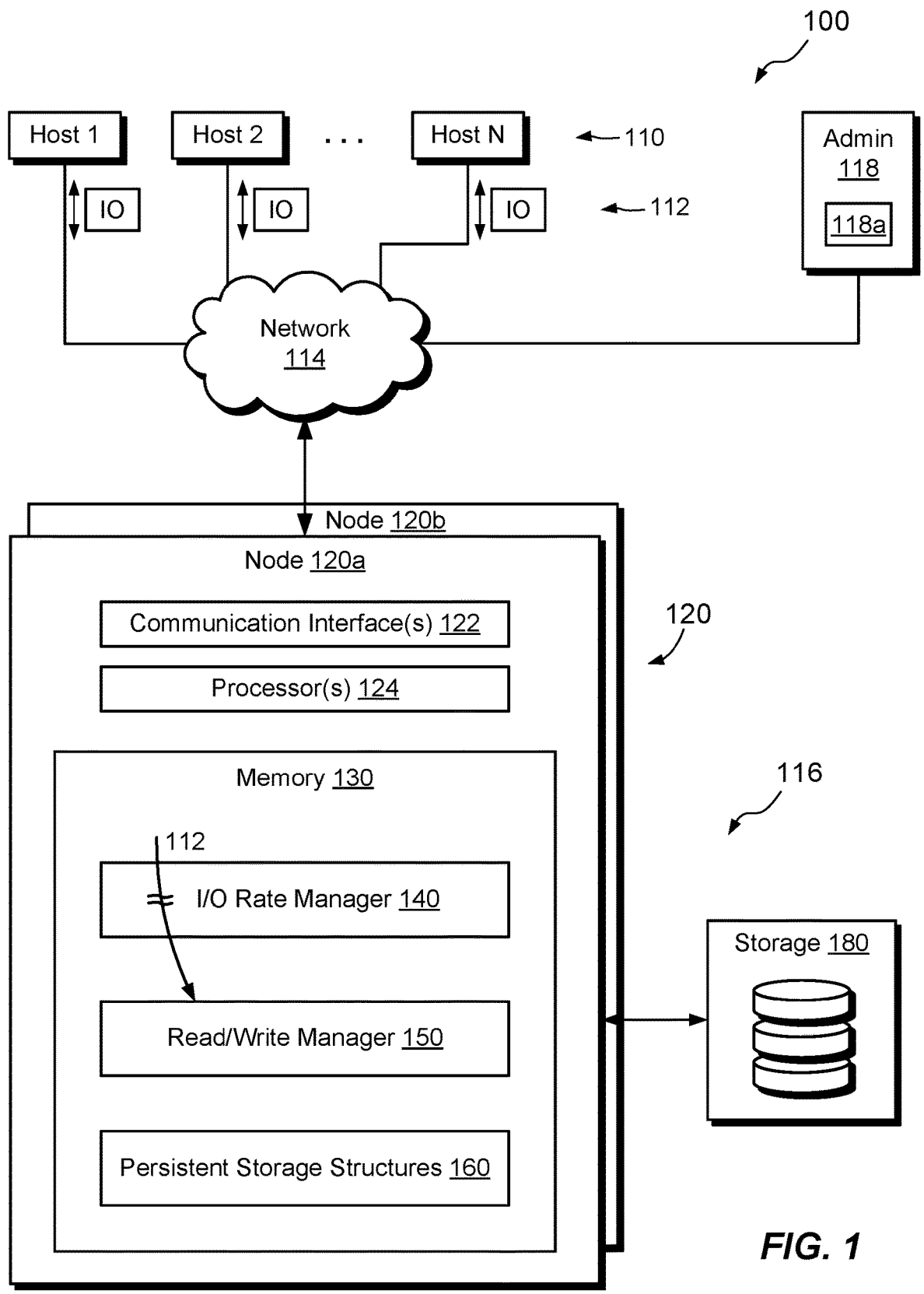
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. An administrative machine 118 may also be configured to access the data storage system 116, e.g., for enabling an administrator to run an administrative program 118a for configuring the data storage system 116.

The data storage system 116 includes one or more nodes 120 (e.g., node 120a and node 120b), and storage 180, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 180.

The depiction of node 120a is intended to be representative of all nodes 120, although nodes 120 may differ from each other in various details. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, an I/O rate manager 140, a data read/write manager 150, and persistent storage structures 160. The I/O rate manager 140 is configured to limit the speed at which I/O requests 112 may be processed. The read/write manager 150 is configured to perform reading and/or writing of host data, and the persistent storage structures 160 are configured to persistently store and organize host data, e.g., in the form of LUNs (Logical UNits), volumes, file systems, virtual machine disks, and the like. One should appreciate that the I/O rate manager 140, read/write manager 150, and persistent storage structures may each have memory-resident components but may also include components that are persistently stored in storage 180.

In example operation, hosts 110 issue I/O requests 112 to the data storage system 116. Node 120 receives the I/O requests 112 at the communication interfaces 122 and initiates further processing. Such processing may include operation of the I/O rate manager 140 to limit the rate at which I/O requests 112 may be forwarded to the read/write manager 150 or to other downstream components for processing, i.e., for effectuating specified read and/or write operations. Read operations may be performed by reading addresses specified in read I/O requests in the persistent storage structures 160 (or within cache, not shown). Likewise, write operations may be performed by writing data specified in write I/O requests to specified addresses in persistent storage structures (or cache).

In an example, the I/O rate manager 140 operates based on settings, which may be configured, for example, by an administrator, e.g., via the administrative program 118a. To this end, the administrative program 118a may include a graphical user interface (GUI) or a command line interface (CLI) for enabling administrators to configure settings. Settings for I/O processing speed may be configurable in any desired manner, such as per host 110, per host application, per volume, per group of volumes, or in any other desired manner. Settings may be configurable for desired groups, e.g., per user group, per tenant, or the like. Alternatively, the same general settings may be applied to all users. In accordance with improvements hereof, settings are provided for configuring baseline I/O processing rate separately from burst I/O processing rate. In addition, settings are provided for specifying a total amount of bursting allowed within a given period, e.g., within a predefined interval.

Figure 2:
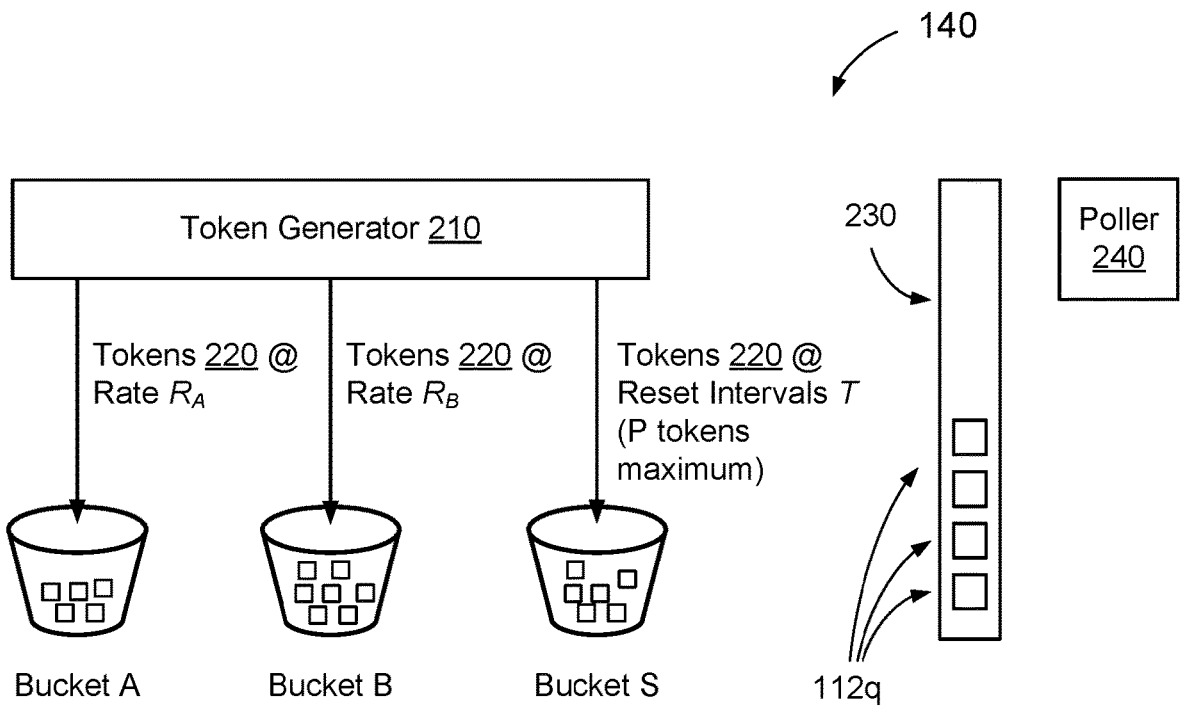
FIG. 2 is a block diagram of an example I/O rate manager of FIG. 1 in additional detail.

FIG. 2 shows an example arrangement of the I/O rate manager 140 in additional detail. Here, three separate token buckets are provided, a first token bucket (Bucket A), a second token bucket (Bucket B), and a third token bucket (Bucket S). A token generator 210 is configured to provide tokens 220 to token buckets A, B, and S at respective rates and/or at respective intervals. Although a single token generator 210 is shown, separate token generators alternatively may be provided, such as one for each of the token buckets A, B, and S. Token generator 210 is preferably implemented in software.

Bucket A receives tokens 220 at a first rate, $R_A$, which is determined so as to satisfy an expected baseline level of I/O requests 112. For example, the rate $R_A$ at which tokens are added to Bucket A closely matches the rate at which tokens are expected to be consumed (subtracted) from Bucket A in exchange for processing the baseline level of I/O requests 112. As I/O requests 112 arrive from hosts, for example, such I/O requests are processed in exchange for tokens, which are expected to be consumed from Bucket A at approximately the same rate $R_A$ at which they are added.

The exchange relationship between tokens and I/O requests can be established in a variety of ways, such as based on numbers of I/O requests, whether the I/O requests are reads or writes, and/or amounts of data to be read or written. In a simple example, one token may be exchanged for processing one I/O request 112, regardless of whether it is a read or a write. In another example, one token may be exchanged for each kilobyte of data to be read or written. For instance, a 1-kB (kilobyte) read may be exchanged for one token, whereas a 10-kB write may be exchanged for 10 tokens. Thus, for example, if the expected baseline level of I/O request processing is 100 kB/s (kilobytes per second), the rate $R_A$ may be set to 100 tokens per second. For ease of processing, the exchange relationship is preferably simple and is based on readily available data; however, arbitrarily complex exchange relationships may also be used.

As further shown in FIG. 2, Bucket B receives tokens 220 at a second rate, $R_B$, which is established to satisfy an expected excess level of I/O requests 112 associated with bursts. For example, if the baseline level of I/O request processing is 100 kB/s and the bursting level is 120 kB/s, then the excess level of I/O request processing would be 20 kB/s (120 kB/s–100 kB/s). To accommodate such excess levels of I/O request processing, the rate $R_B$ may be set to the token-rate equivalent of 20 kB/s, e.g., 20 tokens per second assuming one token is valued at 1 kB. It can thus be seen in this example that Bucket B is filled more slowly than Bucket A ($R_B < R_A$), even though bursting involves a greater rate of I/O requests 112 than does baseline I/O processing. This arrangement reflects the fact that the bursting rate of I/O requests is related to the sum of the baseline rate $R_A$ and the excess rate $R_B$ associated with bursting, rather than just with the bursting rate $R_B$.

In example operation, I/O requests arrive and the I/O rate manager 140 checks Bucket A for sufficient tokens to satisfy those I/O requests. The tokens available from Bucket A are generally sufficient to exchange for incoming I/O requests 112 provided that the rate of those requests does not exceed the expected baseline rate. As long as Bucket A has enough tokens 220 to satisfy the incoming requests, no tokens are drawn from Bucket B. But if Bucket A runs out of tokens 220, indicating that the expected baseline level of I/O requests 112 has been exceeded (i.e., a burst is occurring), tokens 220 may then be drawn from Bucket B, which may continue to pay out tokens until the burst is complete.

If the rate of I/O requests 112 exceeds the expected bursting rate, Bucket A and Bucket B may both run out of tokens 220. Once this occurs, tokens are no longer available to exchange for I/O requests 112. New I/O requests may then be queued, e.g., as I/O requests 112q in queue 230, where they may wait in line for processing until sufficient tokens 220 again become available. Poller 240 may regularly check for queued requests 112q and forward them for processing, in the order received.

The arrangement as described so far accommodates both baseline levels of I/O requests and bursts, but it nevertheless suffers from a deficiency, as nothing described so far limits the duration of bursting. Indeed, bursting may continue at the rate based on $R_A + R_B$ indefinitely, with the two buckets A and B acting effectively as a single bucket.

In accordance with further improvements hereof, this deficiency is addressed by providing Bucket S (the Special bucket). Bucket S is limited in the tokens it receives to no greater than a maximum number P of tokens 220 during predefined intervals (reset intervals) of time, designated by T. For example, Bucket S may be refilled up to P tokens once per reset interval T, which may be a day, an hour, a week, or any other suitable interval of time. Upon the expiration of each reset interval T, the number of tokens 220 in Bucket S may be restored to the allowed maximum number P, such as 50, 100, 200, 1000, etc.

In operation, any time tokens are consumed from Bucket B (during bursts), an equal number of tokens is consumed from Bucket S. But once Bucket S runs out of tokens, no more tokens are allowed to be consumed from Bucket B, even if Bucket B still contains tokens. Only when Bucket S is replenished (at the end of the reset interval 7) can tokens again be drawn from Bucket B. In this manner, Bucket S limits the overall amount of bursting available and prevents applications from sustaining high, bursting levels of I/O requests 112 all of the time.

Token generator 210 may replenish tokens 220 in buckets A, B, and S in any suitable manner. For Buckets A and B, for example, tokens 220 may be replenished continuously or at determined intervals, such as once per minute, once per hour, or the like. Typically, Buckets A and B are replenished at different rates, i.e., $R_A <> R_B$, although circumstances may arise in which these rates are the same. Rates $R_A$ and $R_B$ are typically constant and may be changed only by an administrator. This too is not a firm requirement, however, as rates $R_A$ and $R_B$ may be varied automatically, e.g., in response to load predictions. Bucket S may be replenished once per reset interval T, although this also is not required. For example, if reset interval T is 24 hours and maximum token value P is 120, Bucket S may be topped off to 50 tokens (P/24) every hour. A variety of approaches are feasible.

In some examples, Buckets A, B, and/or S are replenished in response to receipt of I/O requests 112. For instance, when an I/O request 112 is received for processing, the I/O rate manager 140 may check the current time as well as the immediately previous time that a respective bucket was replenished, and then add a number of tokens based on the time difference and the rate of replenishment for the respective bucket.

In an example, Buckets A and B are not allowed to grow indefinitely (e.g., in the absence of I/O requests) but rather are limited in the maximum numbers of tokens they can contain, which may be referred to as respective "bucket sizes." In an example, the sizes of Buckets A and B are set based on their respective rates, $R_A$ and $R_B$. Thus, the size of Bucket A may be proportional to $R_A$ and the size if Bucket B may be proportional to $R_B$. As indicated above, the size of Bucket S is P. A good estimate for P is the $R_B * t$, where "t" is the expected burst duration. The size of Bucket S is typically much larger the size of either Bucket A or Bucket B.

Figure 3:
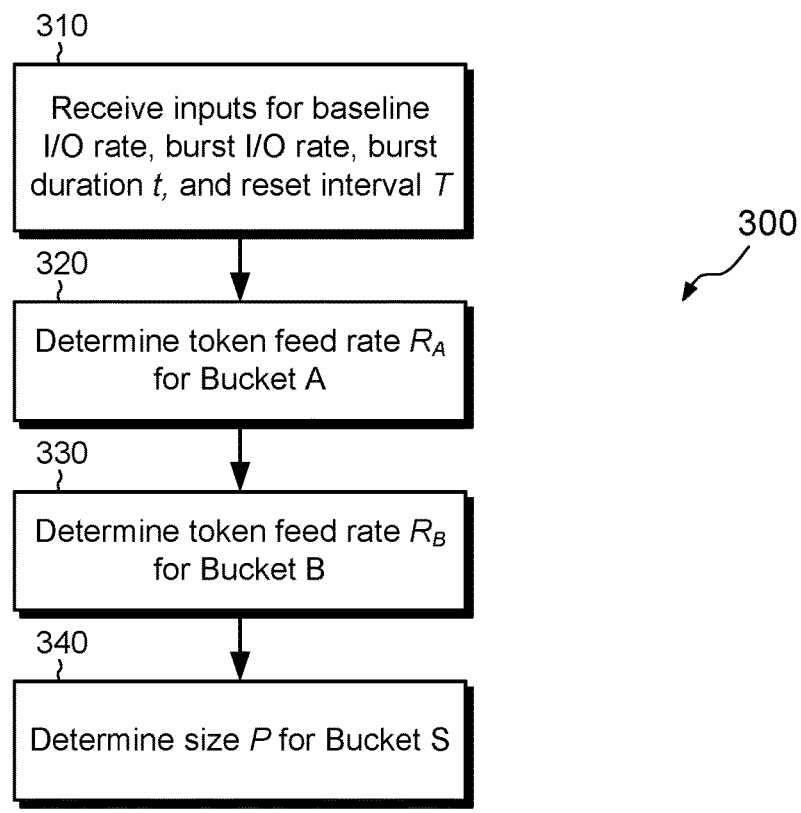
FIG. 3 is a flowchart showing an example method of configuring token buckets of the example I/O rate manager of FIG. 2.

FIG. 3 shows an example method 300 for configuring the I/O rate manager 140. The method 300 may be performed, for example, by the administrative program 118a, which may be operated by an administrator of the data storage system 116, e.g., via a GUI or CLI.

At 310, the administrative program 118a receives inputs for configuring I/O processing rates. Such inputs may include, for example, an expected baseline I/O rate (e.g., I/O's per second or kB/s), an expected burst rate (e.g., I/O's per second or kB/s), a burst duration t (e.g., in minutes or other time units), and a reset interval T (e.g., in minutes or other time units). In some examples, expected baseline I/O rate and expected burst rate are constants for a given system, application, or user, such that the only inputs needed are burst duration t and reset interval T.

At 320, the administrative program 118a determines a token feed rate $R_A$ for Bucket A. For example, $R_A$ may be based on the expected baseline I/O rate. At this time, the administrative program 118a may also determine the size of Bucket A, e.g., based on the token feed rate $R_A$.

At 330, the administrative program 118a determines a token feed rate $R_B$ for Bucket B. For example, $R_B$ may be based on the difference between the expected burst I/O rate and the expected baseline I/O rate. At this time, the administrative program 118a may also determine the size of Bucket B, e.g., based on the token feed rate $R_B$.

At 340, the administrative program 118a determines the size P for Bucket S. For example, P may be computed as $R_B*t$, the expected burst duration.

The above-described acts of method 300 may be performed in any suitable order. In the event that different limits are desired for different entities (applications, hosts, volumes, and the like), the method 300 may be repeated for each such entity.

Figure 4:
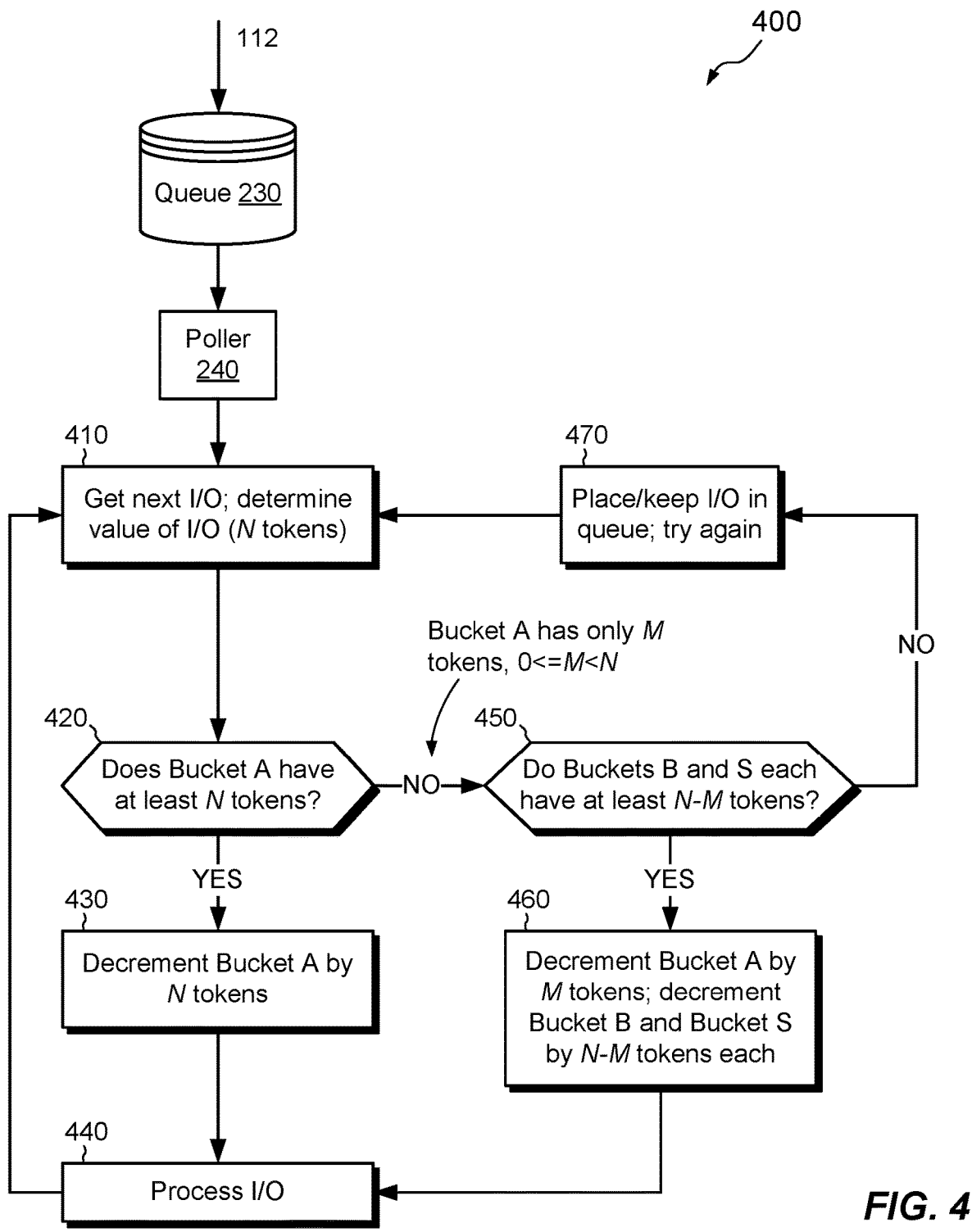
FIG. 4 is a flowchart showing an example method of controlling the rate of I/O request processing using the example I/O rate manager of FIG. 2.

FIG. 4 shows an example method 400 of controlling the rate of I/O request processing. The method 400 is typically performed, for example, by the I/O rate manager 140, which may reside in the memory 130 of node 120a and may be run by the set of processors 124. In method 400, it is assumed that tokens 220 are being added to Buckets A, B, and S in the manner described above in connection with FIG. 2. The focus of method 400 is on consumption (rather than replenishment) of tokens 220.

As shown at the top of FIG. 4, an I/O request 112 arriving from a host 110 may enter the queue 230 (FIG. 2), where the I/O request waits in line to be processed, i.e., in a first-in, first-out (FIFO) manner. Poller 240 regularly checks the queue 230 and forwards the next I/O request 112q in line to step 410 for further processing. It is noted that enqueuing and polling may be avoided if the queue 230 is empty. In such cases, method 400 may instead begin at step 410.

At 410, the I/O rate manager 140 obtains the I/O request 112 and determines the exchange value of that I/O request in tokens 220. As explained above, the exchange value may be a single token for a single I/O request. Alternatively, it may be one token per kilobyte read or written, or some other value. Here, as a general example, we assume that the exchange value of the I/O request 112 is N tokens.

At 420, the I/O rate manager 140 determines whether Bucket A contains at least N tokens. If it does, then operation proceeds to 430, whereupon the Bucket A is decremented by N tokens. At 440, the I/O request 112 is further processed, e.g., by passing the I/O request to the read/write manager 150 for executing the requested read or write. Operation then returns to 410, whereupon the I/O rate manager 140 awaits the next I/O request 112 or, if any I/O requests 112q are waiting in the queue 230, selects the next I/O request 112q in line for processing. Operation then proceeds from there.

Returning to 420, if Bucket A had had only M tokens, M<N, then the I/O request cannot be paid for from Bucket A alone. In this case, operation proceeds to 450, whereupon the I/O rate manager 140 determines whether each of Buckets B and S contains at least N−M tokens, i.e., the balance of required tokens not available from Bucket A. If each of Buckets B and S contains at least N−M tokens, then operation proceeds to 460, whereupon the buckets are decremented. For example, Bucket A is decremented by M tokens and Buckets B and S are each decremented by N−M tokens. Operation then proceeds again to 440, whereupon the I/O request is processed as described above. Operation then returns to 410, where a next I/O request may be obtained for processing.

Returning to 450, if either Bucket B or Bucket S has fewer than N−M tokens, then the I/O request cannot immediately be processed. Instead, the I/O request is placed on the queue 230, or it is kept in the queue if it had previously been obtained from the queue. In other examples, the I/O request may simply be failed, i.e., the node 120a may inform the originating host 110 that the I/O request did not complete. Operation next returns to 410, whereupon the next I/O request is obtained, either directly or from the queue, and the value of the next I/O request in tokens is determined. The method 400 is repeated in this manner indefinitely.

In the manner described, method 400 normally consumes tokens 220 from Bucket A for meeting baseline I/O processing demands. During bursts, method 400 may exhaust Bucket A and turn to Buckets B and S for needed tokens. But I/O requests are queued (or failed) if either Bucket B or Bucket S has fewer than the number of tokens needed. Generally speaking, Bucket B limits the extent of individual bursts, while Bucket S limits the total, overall amount of bursting that may be done during any reset interval T.

Figure 5:
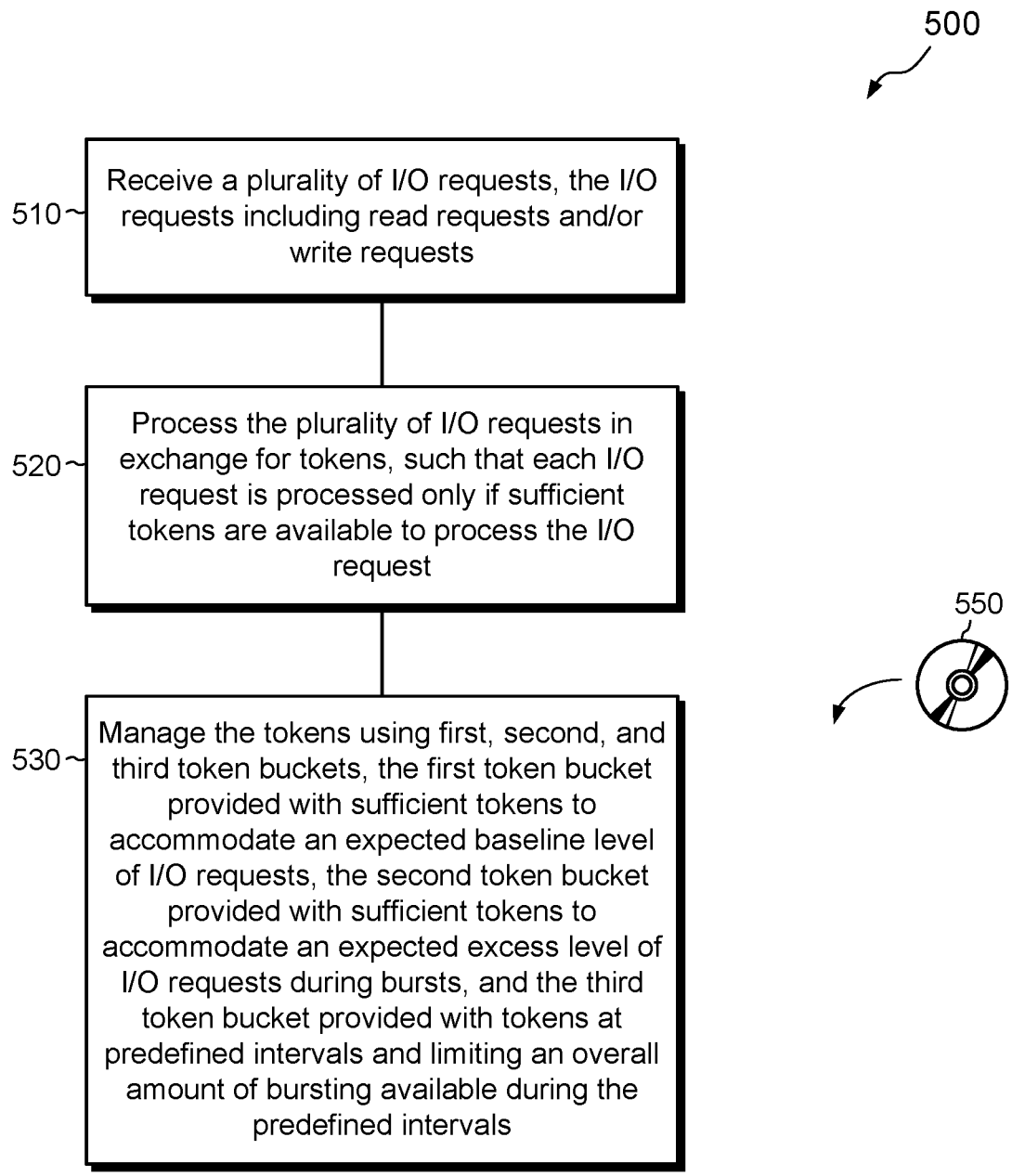
FIG. 5 is a flowchart showing an example method of managing I/O request processing rate.

FIG. 5 shows an example method 500 that may be carried out in connection with the environment 100 and provides a summary of some of the features described above. The method 500 is typically performed, for example, by the software constructs described in connection with FIG. 1, which reside in the memory 130 of the node 120a and are run by the set of processors 124. The various acts of method 500 may be ordered in any suitable way. Accordingly, embodiments may be constructed in which acts are performed in orders different from that illustrated, which may include performing some acts simultaneously.

At 510, a plurality of I/O requests 112 are received. The I/O requests include read requests and/or write requests.

At 520, the plurality of I/O requests 112 are processed in exchange for tokens 220, such that each I/O request 112 is processed only if sufficient tokens 220 are available to process the I/O request 112.

At 530, the tokens are managed using first, second, and third token buckets, such as Bucket A, Bucket B, and Bucket S, respectively. The first token bucket (Bucket A) is provided with sufficient tokens 220 to accommodate an expected baseline level of I/O requests, and the second token bucket (Bucket B) is provided with sufficient tokens to accommodate an expected excess level of I/O requests 112 during bursts. The third token bucket (Bucket S) is provided with tokens at predefined intervals (T) and limits an overall amount of bursting available during the predefined intervals.

An improved technique has been described for managing the rate of I/O (Input/Output) request processing. The technique includes a token-bucket arrangement having first, second, and third token buckets. The first token bucket (Bucket A) is provided with sufficient tokens 220 to accommodate an expected baseline level of I/O requests 112, whereas the second token bucket (Bucket B) is provided with sufficient tokens 220 to accommodate an expected excess level of I/O requests 112 during bursts. The third token bucket (Bucket S) is provided with tokens 220 at predefined intervals (T) and limits a total amount of bursting available during those intervals.

Having described certain embodiments, numerous alternative embodiments or variations can be made. For example, although the I/O rate manager 140 has been shown at a particular level of I/O processing (e.g., prior to read/write manager 150), this is merely an example. Alternatively, the I/O rate manager 140 may be disposed at any suitable level of I/O request processing where it is desired to limit processing speed.

Further, although the processing of I/O requests 112 has been described as proceeding one I/O request at a time, where each I/O request has an equivalent token value, embodiments are not limited to this arrangement. For example, an alternative arrangement may process I/O requests in batches, where each batch is assigned an equivalent token value and is processed (e.g., in FIG. 4) on a per-batch basis, rather than a per-I/O request basis.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing I/O request processing rate, comprising:
   receiving a plurality of I/O requests, the I/O requests including read requests and/or write requests;
   processing the plurality of I/O requests in exchange for tokens, such that each I/O request is processed only if sufficient tokens are available to process the I/O request; and
   managing the tokens using first, second, and third token buckets, the first token bucket provided with sufficient tokens to accommodate an expected baseline level of I/O requests, the second token bucket provided with sufficient tokens to accommodate an expected excess level of I/O requests during bursts, and the third token bucket provided with tokens at predefined intervals and limiting an overall amount of bursting available during the predefined intervals,
   wherein the method further comprises calculating a respective number of tokens needed for each I/O request of the plurality of I/O requests and, for each I/O request of the plurality of I/O requests for which the first token bucket contains fewer than the respective number of tokens but the second and third token buckets each contain at least a balance of tokens not found in the first token bucket, decrementing the first token bucket by the number of tokens in the first token bucket and decrementing each of the second and third token buckets by the balance of tokens not found in the first token bucket.

2. The method of claim 1, further comprising:
   for each I/O request of the plurality of I/O requests for which the first token bucket contains at least the respective number of tokens, decrementing the first token bucket by the respective number of tokens.

3. The method of claim 2, further comprising, for each I/O request of the plurality of I/O requests for which the first token bucket contains fewer than the respective number of tokens and at least one of the second and third token buckets contains fewer than a balance of tokens not found in the first token bucket, enqueue the respective I/O request for later processing or fail the respective I/O request.

4. The method of claim 3, further comprising replenishing tokens in the first bucket at a first rate determined to accommodate the expected baseline level of I/O requests.

5. The method of claim 4, further comprising replenishing tokens in the second bucket at a second rate determined to accommodate the expected excess level of I/O requests during bursts.

6. The method of claim 5, wherein the first rate and the second rate are each constant.

7. The method of claim 3, further comprising replenishing tokens in the third bucket at the regular intervals, wherein numbers of tokens provided at the regular intervals are based on a total excess level of I/O requests allowed during the regular intervals.

8. The method of claim 1, further comprising calculating respective numbers of tokens needed for respective I/O requests of the plurality of I/O requests based on at least one of (i) a constant number of tokens for each I/O request, (ii) whether each I/O request is a read or a write, and/or (iii) amounts of data specified to be written and/or read by each I/O request.

9. The method of claim 1, further comprising, in response to receipt of a first I/O request:
calculating a number $N_1$ of tokens for the first I/O request;
determining that the first token bucket has only $M_1$ tokens, where $M_1$ is less than $N_1$;
determining that the second and third token buckets each have at least $N_1-M_1$ tokens; and
processing the first I/O request by, in any order, (i) decrementing the first token bucket by $M_1$ tokens, (ii) decrementing each of the second and third token buckets by $N_1-M_1$ tokens, and (iii) forwarding the first I/O request to subsequent processing layers.

10. The method of claim 1, further comprising, in response to receipt of a second I/O request:
calculating a number $N_2$ of tokens for the second I/O request;
determining that the first token bucket has only $M_2$ tokens, where $M_2$ is less than $N_2$;
determining that at least one of the second and third token buckets has fewer than $N_2-M_2$ tokens; and
queuing or failing the second I/O request in response to the determination that at least one of the second and third token buckets has fewer than $N_2-M_2$ tokens.

11. The method of claim 1, further comprising, in response to receipt of a third I/O request:
calculating a number $N_3$ of tokens for the third I/O request;
determining that the first token bucket has at least $N_3$ tokens; and
processing the third I/O request by, in any order, (i) decrementing the first token bucket by Ns tokens and (ii) forwarding the third I/O request to subsequent processing layers.

12. A computerized apparatus, comprising control circuitry that includes a set of processors coupled to memory, the control circuitry constructed and arranged to:
receive a plurality of I/O requests, the I/O requests including read requests and/or write requests;
process the plurality of I/O requests in exchange for tokens, such that each I/O request is processed only if sufficient tokens are available to process the I/O request; and
manage the tokens using first, second, and third token buckets, the first token bucket provided with sufficient tokens to accommodate an expected baseline level of I/O requests, the second token bucket provided with sufficient tokens to accommodate an expected excess level of I/O requests during bursts, and the third token bucket provided with tokens at predefined intervals and limiting an overall amount of bursting available during the predefined intervals,
wherein the control circuitry is further constructed and arranged to calculate a respective number of tokens needed for each I/O request of the plurality of I/O requests and, for each I/O request of the plurality of I/O requests for which the first token bucket contains fewer than the respective number of tokens but the second and third token buckets each contain at least a balance of tokens not found in the first token bucket, decrement the first token bucket by the number of tokens in the first token bucket and decrement each of the second and third token buckets by the balance of tokens not found in the first token bucket.

13. A computer program product including a set of non-transitory, computer-readable media having instructions which, when executed by control circuitry of a computerized apparatus, cause the computerized apparatus to perform a method of managing I/O request processing rate, the method comprising:
receiving a plurality of I/O requests, the I/O requests including read requests and/or write requests;
processing the plurality of I/O requests in exchange for tokens, such that each I/O request is processed only if sufficient tokens are available to process the I/O request; and
managing the tokens using first, second, and third token buckets, the first token bucket provided with sufficient tokens to accommodate an expected baseline level of I/O requests, the second token bucket provided with sufficient tokens to accommodate an expected excess level of I/O requests during bursts, and the third token bucket provided with tokens at predefined intervals and limiting an overall amount of bursting available during the predefined intervals,
wherein the method further comprises calculating a respective number of tokens needed for each I/O request of the plurality of I/O requests and, for each I/O request of the plurality of I/O requests for which the first token bucket contains fewer than the respective number of tokens but the second and third token buckets each contain at least a balance of tokens not found in the first token bucket, decrementing the first token bucket by the number of tokens in the first token bucket and decrementing each of the second and third token buckets by the balance of tokens not found in the first token bucket.

14. The computer program product of claim 13, wherein the method further comprises:
for each I/O request of the plurality of I/O requests for which the first token bucket contains at least the respective number of tokens, decrementing the first token bucket by the respective number of tokens.

15. The computer program product of claim 14, wherein the method further comprises, for each I/O request of the plurality of I/O requests for which the first token bucket contains fewer than the respective number of tokens and at least one of the second and third token buckets contains fewer than a balance of tokens not found in the first token bucket, enqueue the respective I/O request for later processing or fail the respective I/O request.

16. The computer program product of claim 15, wherein the method further comprises replenishing tokens in the first bucket at a first rate determined to accommodate the expected baseline level of I/O requests.

17. The computer program product of claim 16, wherein the method further comprises replenishing tokens in the second bucket at a second rate determined to accommodate the expected excess level of I/O requests during bursts.

18. The computer program product of claim 17, wherein the first rate and the second rate are each constant.

19. The computer program product of claim 15, wherein the method further comprises replenishing tokens in the third bucket at the regular intervals, numbers of tokens provided at the regular intervals being based on a total excess level of I/O requests allowed during the regular intervals.

20. The computer program product of claim 13, wherein the method further comprises calculating respective numbers of tokens needed for respective I/O requests of the plurality of I/O requests based on at least one of (i) a constant number of tokens for each I/O request, (ii) whether each I/O request is a read or a write, and/or (iii) amounts of data specified to be written and/or read by each I/O request.

* * * * *